United States Patent [19]

Suzuki

[11] Patent Number: 5,282,055
[45] Date of Patent: Jan. 25, 1994

[54] COMPRESSING A REGULAR SCAN IMAGE USING CODING PARAMETER FROM THE PRESCAN IMAGE

[75] Inventor: Kazuhiro Suzuki, Kanagawa, Japan

[73] Assignee: Fuji Xerox Co., Ltd., Tokyo, Japan

[21] Appl. No.: 836,824

[22] Filed: Feb. 19, 1992

[30] Foreign Application Priority Data

Feb. 20, 1991 [JP] Japan ................................ 3-026193

[51] Int. Cl.$^5$ .................... H04N 1/41; H04N 1/40; H04N 1/04
[52] U.S. Cl. .................... 358/427; 358/261.1; 358/261.3; 358/448; 358/474; 358/486; 358/426
[58] Field of Search ........... 358/427, 426, 448, 261.1, 358/261.2, 261.3, 474, 486

[56] References Cited

U.S. PATENT DOCUMENTS

| | | | |
|---|---|---|---|
| 4,107,648 | 8/1978 | Frank | 358/261.3 |
| 4,920,501 | 4/1990 | Sullivan et al. | 358/457 |
| 5,148,294 | 9/1992 | Kurogane et al. | 358/448 |
| 5,150,223 | 9/1992 | Telle | 358/448 |
| 5,170,264 | 12/1992 | Saito et al. | 358/426 |

FOREIGN PATENT DOCUMENTS

63-222591 9/1988 Japan .
2-305182 12/1990 Japan .
2-311085 12/1990 Japan .

OTHER PUBLICATIONS

Activity Detection Method for Solid-State Still Camera Using DCT Data Compression, Takizawa et al., IEICE Spring Conference, D-97, 1989, 7-79.
A Rate-Adaptive DCT Coding For Use In Solid-State Still Camera, Watanabe et al., IEICE Spring Conference, D-159, 1989, 7-14.

*Primary Examiner*—Edward L. Coles, Sr.
*Assistant Examiner*—Kimberly A. Williams
*Attorney, Agent, or Firm*—Finnegan, Henderson, Farabow, Garrett & Dunner

[57] ABSTRACT

An image data compressing method of the type in which a multi-valued image data signal read by an image input unit is compressed by an image data compressing circuit to be stored into a memory. In the image data compressing method, the image input unit performs a prescan, thereby to obtain prescan image data containing pixels smaller in number than those contained in image data of an original image Next, a definition of the original image is estimated on the basis of the prescan image data, thereby to obtain coding parameters for the image data compressing circuit. Then, the image input unit performs a regular scan, thereby to obtain regular scan image data containing all of pixels of the original image data. Finally, the regular scan image data is compressed using the coding parameters previously obtained.

5 Claims, 6 Drawing Sheets

FIG. 2
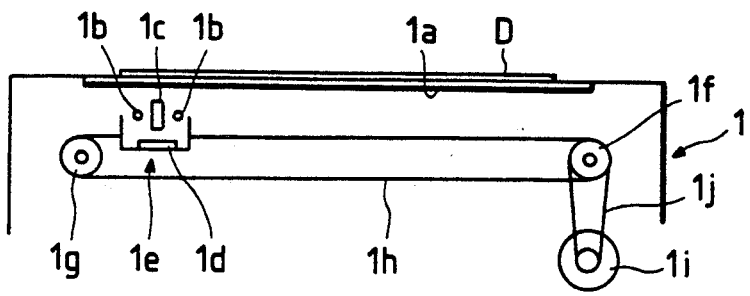
FIG. 3
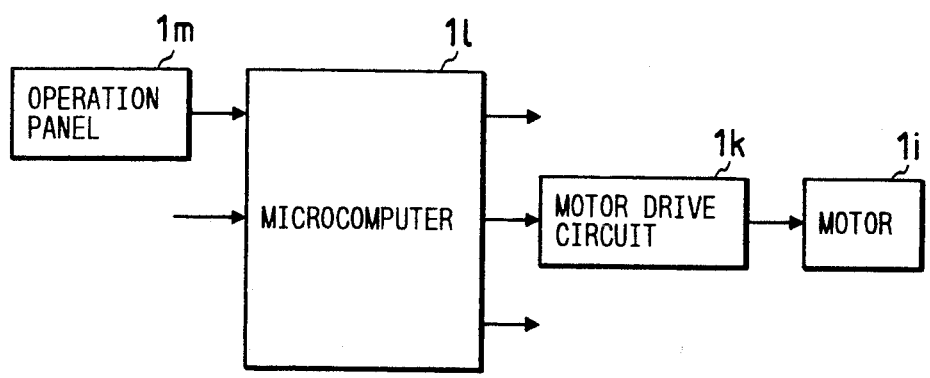
FIG. 4(a)   FIG. 4(b)
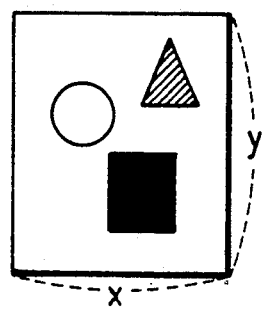   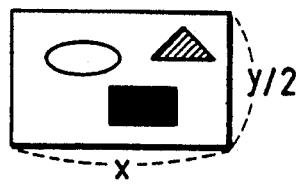

FIG. 5(a)  FIG. 5(b)
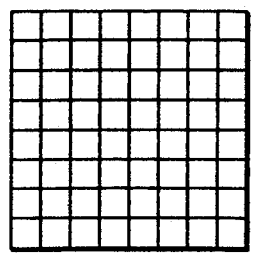
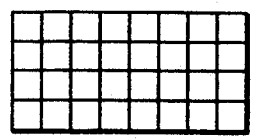
FIG. 9
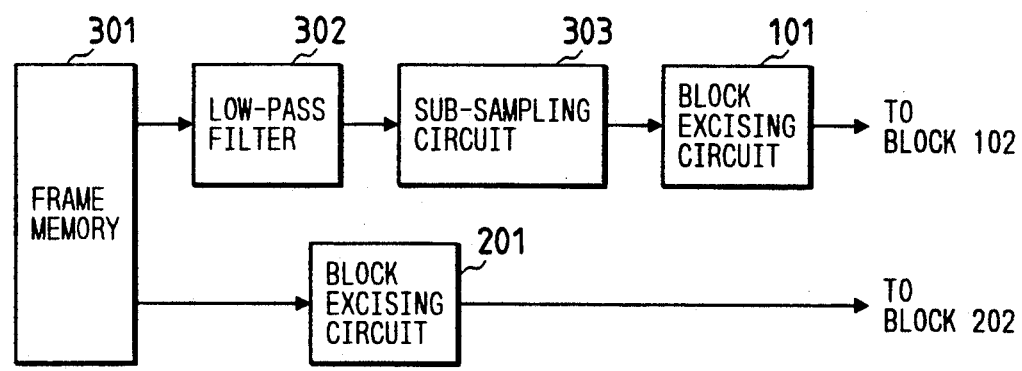

FIG. 6(a)

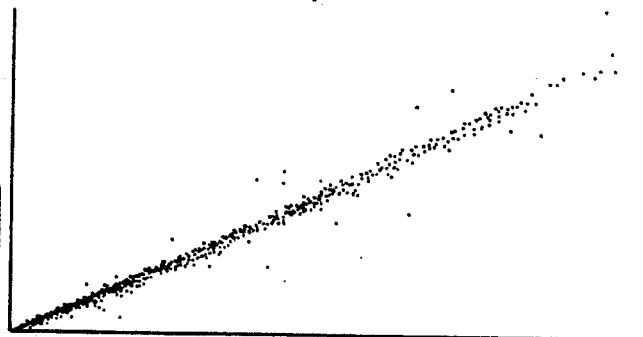

STANDARD DEVIATION IN EACH OF 4×8 PIXEL BLOCKS IN PRESCAN IMAGE DATA (NORMALIZED AT THE SAME VALUE AS THAT OF THE ABSCISSA) L*COMPONENT

STANDARD DEVIATION IN EACH OF 8×8 PIXEL BLOCKS IN REGULAR SCAN IMAGE DATA (NORMALIZED AT THE MAXIIMUM VALUE)

FIG. 6(b)

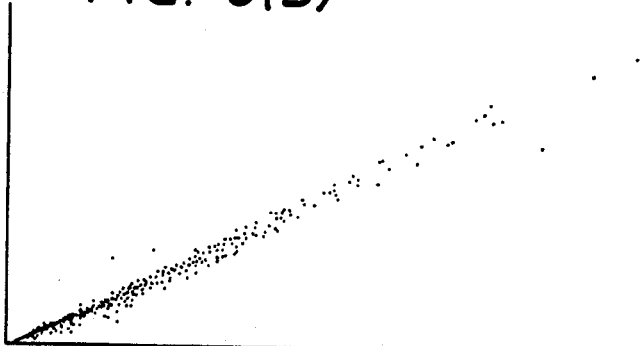

STANDARD DEVIATION IN EACH OF 4×8 PIXEL BLOCKS IN PRESCAN IMAGE DATA (NORMALIZED AT THE SAME VALUE AS THAT OF THE ABSCISSA) a*COMPONENT

STANDARD DEVIATION IN EACH OF 8×8 PIXEL BLOCKS IN REGULAR SCAN IMAGE DATA (NORMALIZED AT THE MAXIIMUM VALUE)

FIG. 6(c)

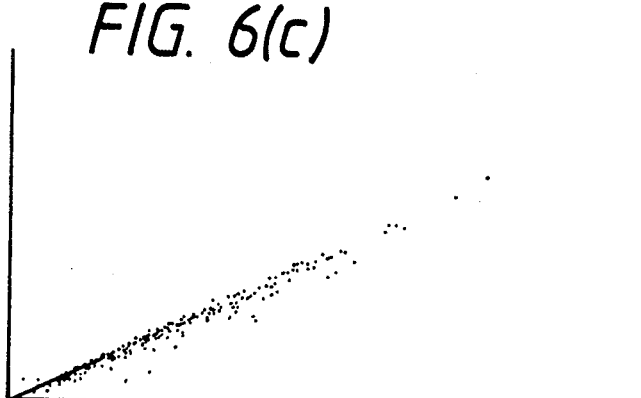

STANDARD DEVIATION IN EACH OF 4×8 PIXEL BLOCKS IN PRESCAN IMAGE DATA (NORMALIZED AT THE SAME VALUE AS THAT OF THE ABSCISSA) b*COMPONENT

STANDARD DEVIATION IN EACH OF 8×8 PIXEL BLOCKS IN REGULAR SCAN IMAGE DATA (NORMALIZED AT THE MAXIIMUM VALUE)

COMPRESSING A REGULAR SCAN IMAGE USING CODING PARAMETER FROM THE PRESCAN IMAGE

BACKGROUND OF THE INVENTION

The present invention relates to an image data compressing method in use with an image processor which can receive and output multi-valued image data.

In a digital copying machine, for example, an image input unit reads image data on an original document, and converts the data into a digital image signal. The digital image signal is temporarily stored in a memory. Various types of image processing are applied to the digital image data. Finally, an image output unit outputs the processed image data onto a sheet of record paper.

In the image data processing system of the type in which image data is processed after being converted to digital image data, the quantity of data to be handled is remarkably increased as a definition of the digital image becomes high and the images to be handled become color images. To store such a large quantity of data, a large memory capacity is required for the memory. The memory of the large memory capacity is expensive, and consequently increases the cost to manufacture.

To cope with the problem, an attempt to use the data compressing techniques has been made.

A discrete cosine transform coding method (referred to as a DCT method), as one of the data compressing techniques, will be incorporated into the international standards. Preparatory work for the international standards is currently progressing under the cooperation of ISO and CCITT. The DCT method has been known as a method capable of compressing the image data of a natural image at a high efficiency. As also known, the method has a shortcoming that the compression ratio is highly responsive to and readily varies with the high frequency components contained in the image data. The variation of the compression ratio must be made to converge to a predetermined value. The cost (computational quantity and time) to realize this is large.

Another coding method is proposed in the following literatures (1) and (2). In the coding method, an average energy of the whole image and a distribution of local energies of the image are measured before the image data is coded. The coding parameters are controlled so that the compressed result is below a predetermined code quantity.

LITERATURE (1): "Activity Detection Method for Solid-State Still Video Camera Using DCT Data Compression" by Takizawa et. al., IEICE (Institute of Electronics.Information and Communication Engineers) Spring Conference, D-97, 1989, 7-79.

LITERATURE (2) "A Rate-Adaptive DCT Coding for use in Solid-State Still Camera" by Watanabe et. al., IEICE Spring Conference, D-159, 1989, 7-14.

The coding systems described in the above literatures are applicable only for the image that is obtained by a solid-state electronic camera with a small image pickup area. The number of pixels of the image is relatively small, e.g., 720×480 pixels. Accordingly, it is possible to start the image data processing after the image data is completely stored in the memory.

In the case of a full-color digital copying machine, the size of the image per se is large, and image data of three colors is required. Therefore, the number of pixels to be processed is considerably large. For example, in an image of which the size is A3 (297 mm×429 mm), and the resolution is 400 spi (spot per inch), the number of pixels to be processed is 6720×4752 pixels. To store such a great number of pixel data items, the memory capacity must be large, and much time is required to process the image data.

In the circumstances, other coding parameter estimation methods operable at high speed and not requiring a large memory capacity are required.

One of the estimation methods is disclosed in Japanese Patent Unexamined Publication No. Sho. 63-222591. In the method disclosed, the data compressing method is based on the vector quantizing process. In the full-color digital copying machine, however, the DCT coding system is employed, as a standard coding system, for the data compressing system which is used for memory saving purposes. The data which is coded by the vector quantizing method is incompatible with the data which is coded by the DCT coding system, because the data coding systems are different from each other. To secure the communication of it with other devices, the coded data must be changed so as to be compatible with the coding systems of the other devices.

SUMMARY OF THE INVENTION

The present invention has been made in view of the above circumstances and has an object to provide an image data compressing method which can compress image data at high speed and reduce a necessary memory capacity of the image memory.

To achieve the above object, the present invention provides an image data compressing method of the type in which a multi-valued image data signal read by an image input unit is compressed by an image data compressing circuit to be stored into a memory, comprising the steps of performing a prescan by the image input unit, thereby to obtain prescan image data containing pixels smaller in number than those contained in image data of an original image; estimating a definition of the original image on the basis of the prescan image data, thereby to obtain coding parameters in the image data compressing circuit; performing a regular scan by the image input unit, thereby to obtain regular scan image data containing all of pixels of the original image data; and compressing the regular scan image data using the coding parameters previously obtained.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIG. 2 is a side view showing the construction of the image input unit in the copying machine of FIG. 1;

FIG. 3 is a block diagram partially showing a control circuit for controlling the movement of the scanning member of FIG. 2;

FIGS. 4(a) and 4(b) are explanatory diagrams for explaining the number of pixels in an image gained by a regular scan, and that of an image by a prescan;

FIG. 5(a) is an explanatory diagram showing 8×8 pixel blocks for dividing an original image;

FIG. 5(b) is an explanatory diagram showing 4×8 pixel blocks for dividing a prescan image;

FIG. 6(a) is a graph showing the correlation of the standard deviation of L* component between the prescan image consisting of 4×8 pixel blocks and the original image consisting of 8×8 pixel blocks;

FIG. 6(b) is a graph showing the correlation of the standard deviation of a* component between the prescan image consisting of 4×8 pixel blocks and the original image consisting of 8×8 pixel blocks;

FIG. 6(c) is a graph showing the correlation of the standard deviation of b* component between the prescan image consisting of 4×8 pixel blocks and the original image consisting of 8×8 pixel blocks;

FIG. 9 is a block diagram showing another example of the construction of the input section in the image compressing/expanding circuit of FIG. 8.

DETAILED DESCRIPTION OF THE PREFERRED EMBODIMENTS

Preferred embodiments of the present invention will be described in detail with reference to the accompanying drawings.

Figure 1:
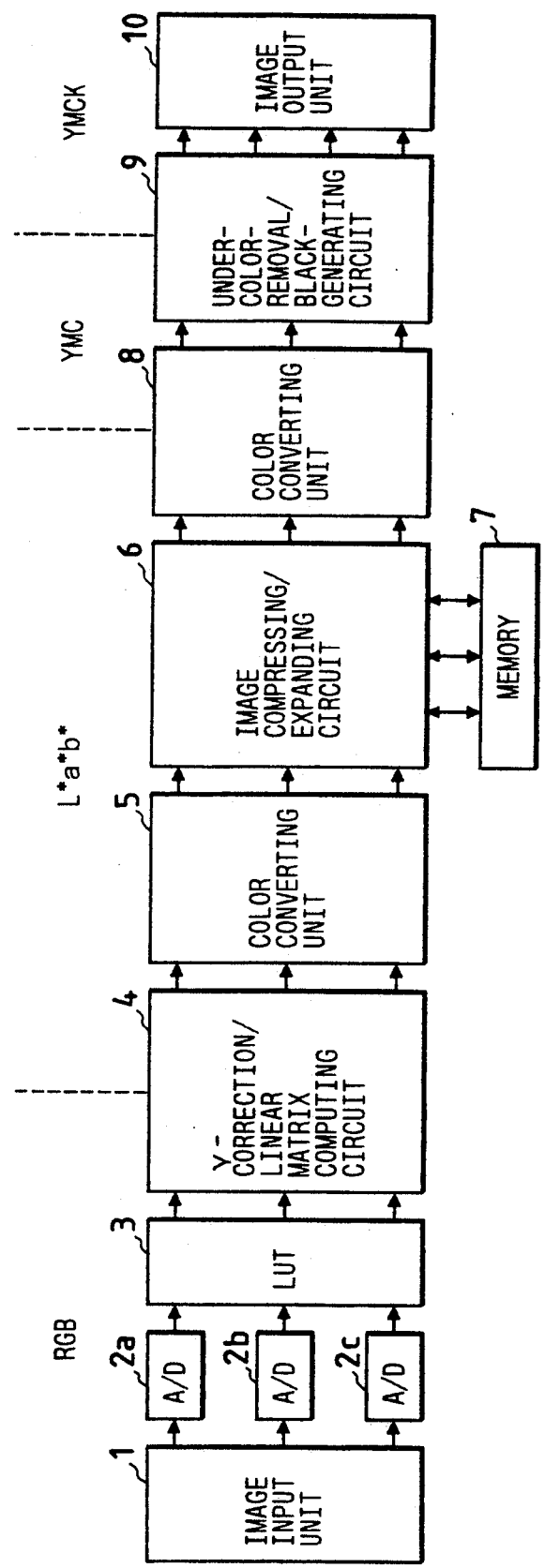
FIG. 1 is a block diagram showing the construction of lo a digital color copying machine to which an image data compressing method according to the invention is applied.

FIG. 1 is a block diagram showing the construction of a digital color copying machine to which an image data compressing method of the invention is applied.

An image input unit 1 reads a color image on an original document (referred to as an original image) in multi-tone mode, and produces density R, G, and B signals representative of densities of red, green, and blue in the original image. FIG. 2 is a view showing the construction of the image input unit 1. As shown, a scanning member 1e including a light source 1b, a lens 1c, an image sensor 1d, and the like, is disposed under a platen glass 1a on which an original document D is located. The scanning member 1e is coupled with a drive wire 1h wound between a drive pulley 1f and a follower pulley 1g. The drive pulley 1f is driven to rotate through a timing belt 1j when a motor 1i is operated. Then, the scanning member 1e is moved along the lower surface of the platen glass 1a.

As shown in FIG. 3, the motor 1i is connected to a motor drive circuit 1k. By a control signal from a microcomputer 11, the motor drive circuit 1k controls a rotating speed of the motor 1i. An operation panel 1m from which various instructions are applied to the copying machine is connected to the microcomputer 11. Actually, other input/output units than the above-described units are connected to the microcomputer 11, but those are omitted here for simplicity.

Light emitted from the light source 1b of the scanning member 1e is applied to the original D. Light reflected from the original D is focused on the image sensor 1d, through the lens 1c. The image sensor 1d linearly extends in the direction orthogonal to the moving direction of the scanning member 1e, and reads the image on the original D in the main scan direction. The image sensor 1d also reads the image in the auxiliary scan direction while the scanning member 1e is moved along the surface of the original. Then, the image sensor 1d produces image signals, which depend on a density distribution on the original image. In the instant embodiment, the image sensor 1d is a color image sensor capable of generating density R, G, and B signals, which respectively correspond to the red, green, and blue components of the original image.

The density R, G, and B signals are respectively converted into digital signals by A/D converters 2a, 2b, and 2c (see FIG. 1). In a lock-up table (denoted as LUT in the figure) 3, the signals representative of reflectivities are raised to the ($\frac{1}{3}$)th power to form value signals. A γ-correction/linear matrix computing circuit 4 makes γ-correction to the value signals, and converts the density R, G, and B signals into signals in an L*-a*-b* space as a constant hue space. A color converting unit 5 applies a proper color correction processing to the image signals in the L*-a*-b* space. Specifically, the color converting unit 5 performs the color adjustment of the image signals by using hue, value and saturation. An image compressing/expanding circuit 6 compresses those image signals and stores the compressed signals in a memory 7. If necessary, the image compressing/expanding circuit 6 expands the compressed image signals to reproduce the image signals. The operation of the image compressing/expanding circuit 6 will be described in detail later. A color converting unit 8 converts the output signals L*, a*, and b* output from the image compressing/expanding circuit 6 into Y (yellow), M (magenta), and C (cyan) signals representing the quantities of Y, M and C coloring materials. An under-color-removal/black generating circuit 9 performs the under-color removal, and generates a black signal (K signal). An image output unit 10 records a color image on a sheet of record paper on the basis of Y, M, C, and K signals representing the quantities of the Y, M, C, and K coloring materials.

In compressing and encoding the image data by the image compressing/expanding circuit 6, two types of coding parameters are used. The first one is a coding parameter (referred to as a whole coding parameter) determined every image by the feature of the whole image of a character image or a photograph image. The second one is a coding parameter (referred to as a local coding parameter) determined by the features of local areas in an image, such as an edge-contained area and a flat area.

The whole coding parameter may be considered as a normalizing factor to increase or decrease the quantizing step width used when the coefficient obtained after converting are quantized in the converting and coding operations. The local coding parameter may be considered as a bit distribution or assignment to respective blocks.

In the coding systems described in the literatures (1) and (2), the two types of parameters are determined on the basis of output signal of a filter, which has a correlation with the standard deviation (variance) every block of an image when the image is divided into blocks. Specifically, the whole coding parameter is determined depending on a mean value of the filter output signals of all of the blocks in an image. The assignment of bits is determined depending on the filter output signal of each block. In this way, the effective coding is achieved in those literatures.

In the present embodiment, in determining the coding parameters, a prescan is performed to discretely scan the pixels of an original image before a regular scan to continuously scan all of the pixels of the original image.

The coding parameters are determined on the basis of the prescan results.

The prescan will be described. In the description, a vertical scan or auxiliary scan of which the scan speed is two times as high as a regular scan speed, is used for the prescan. An image, which is obtained by scanning an original document in a regular scan mode, contains an "x" number of pixels in the main scan direction and a "y" number of pixels in the auxiliary scan direction, as shown in FIG. 4(a). An image, which is obtained by scanning the original document in a prescan mode, contains an "x" number of pixels in the main scan direction and a "y/2" number of pixels in the auxiliary scan direction, as shown in FIG. 4(b). Thus, the number of pixels of the prescan image in the auxiliary scan direction is ½ that of the original image. The original image is divided into 8×8 blocks as shown in FIG. 5(a). The prescan image consists of 8 ×4 blocks, as shown in FIG. 5(b).

Figure 7:
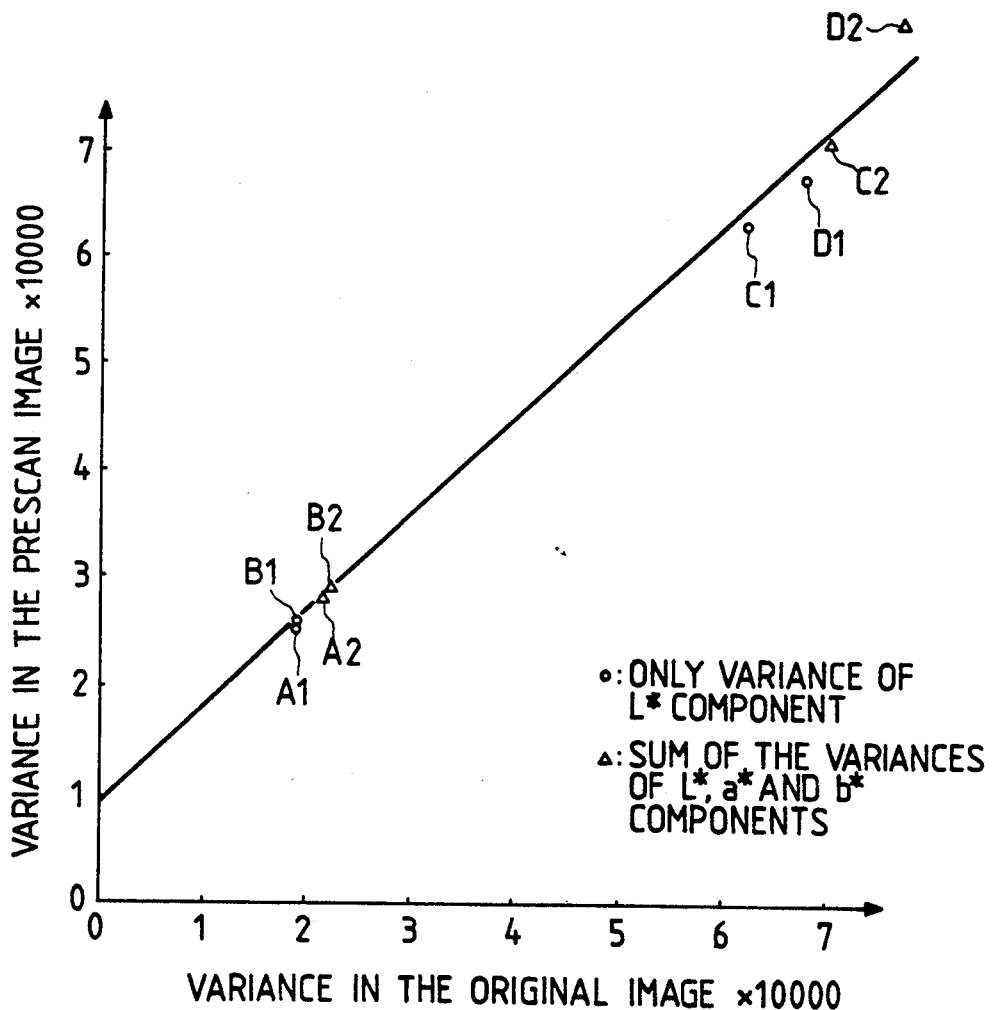
FIG. 7 is a graph showing the correlation of the variance between a prescan image and an original image.

When comparatively studying the original image and the prescan image, it is seen from FIGS. 6(a) to 6(c) that there is a correlation in the standard deviation between the original image and the prescan image. FIG. 6(a) shows the standard deviation relationship of the L* component between the original image and the prescan image; FIG. 6(b), the standard deviation relationship of the a* component; and FIG. 6(c), the standard deviation relationship of the b* component. In the graphs of FIGS. 6(a) to 6(c), the abscissa is normalized at the maximum value, and the ordinate is also normalized at the same value. FIG. 7 shows a correlation between the mean value of the variances of all of the blocks of the original image and the o mean value of the variances of those of the prescan image. In the graph of FIG. 7, points A1, B1, C1 and D1 respectively represent only the variances of the L* components of sample images A, B, C, and D, which are different from one another. A2, B2, C2, and D2 represent the sum of the variances of the components L*, a*, and b*, respectively.

A definition of an original image can be estimated from a prescan image of which the data quantity is ½ as large as that of the original image, by utilizing the above relationships. The coding parameters can be determined on the basis of the definition estimated. As already described, the definition corresponds to a variance (standard deviation) in an image. A definition of an image of which the pixel value sharply changes for each pixel is high. To the contrary, a definition of an image of which the pixel value gently changes for each pixel is low.

In the above example, the standard deviations or the variances are used for determining the definition of an image. A statistic, such as the sum of the absolute values of the differences between the pixel values within the blocks and the mean values of them, may be used for determining the definition.

Figure 8A:
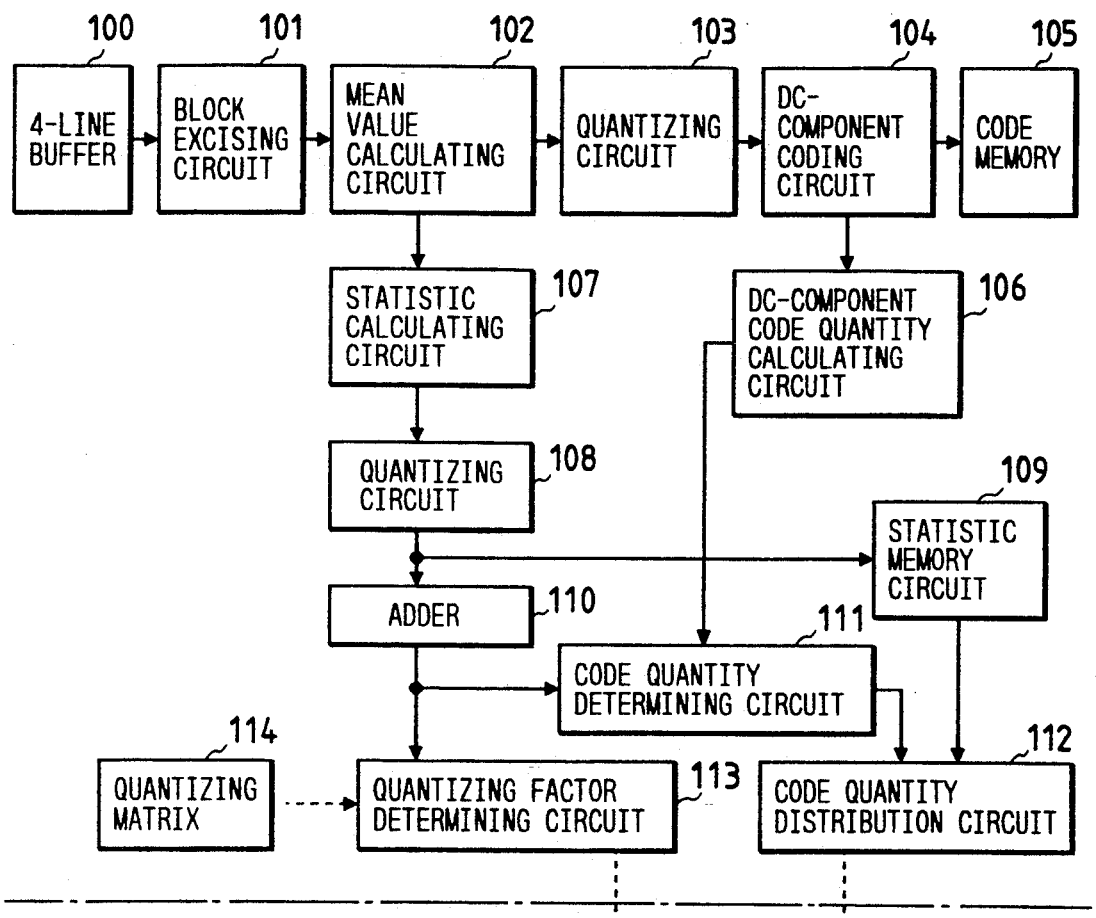
FIGS. 8(a) and 8(b) are block diagrams showing the construction of the image compressing/expanding circuit of FIG. 1.
Figure 8B:
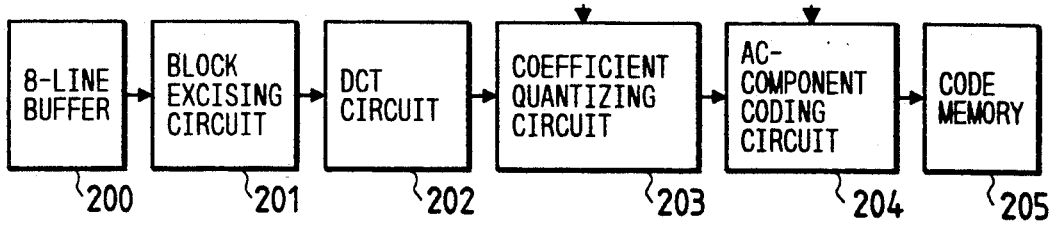

The processing operations by the image compressing-/expanding circuit 6 will be described with reference to FIGS. 8(a) and 8(b). FIG. 8(a) shows a circuit configuration for the image processing in the prescan mode. FIG. 8(b) shows a circuit configuration for the image processing in the regular scan mode. The entire circuit shown in FIGS. 8(a) and 8(b) is designed to be capable of processing an image of one color. To process an image that can be separated into a plurality of color components, such as a color image, the processing circuit as shown in FIGS. 8(a) and 8(b) must be provided for each color component.

In operation, a process start command is entered from the operation panel 1m, for example, and then the microcomputer 11 sends a prescan command to the motor drive circuit 1k. Upon receipt of the command, the motor 1i is rotated at 9 speed two times higher than the normal speed, and a scanning member 1e vertically scans an image at 9 speed two times higher than the the normal speed. Thus, a prescan is performed. In other words, the vertical scan or auxiliary scan is performed with the ½ resolution.

Prescan image data thus obtained is loaded into a 4-line buffer 100. A block excising circuit 101 excises pixel blocks of 8×4 from the buffer. Next, a mean value calculating circuit 102 calculates a mean pixel value in each block. The mean pixel value is treated as a mean pixel value of the corresponding block in an original image, that is, a DC component. The DC components are quantized in a quantizing circuit 103. A DC-component coding circuit 104 encodes the quantized DC components by the differential pulse code modulation (DPCM). The codes thus formed are stored into a code memory 105. The code quantity used for coding the DC components is counted by a DC-component code quantity calculating circuit 106.

On the other hand, a statistic calculating circuit 107 calculates a statistic representative of a definition of each block on the basis of the pixel blocks excised by the block excising circuit 101 and the mean value calculated by the mean value calculating circuit 102. The statistic may be expressed in terms of any of the standard deviation and variance, the sum of the absolute values of the difference between each in-block pixel value and the mean value of these pixel values, and the like. A quantizing circuit 108 quantizes the statistic in connection with a range of values of the statistic calculated for each block, and a memory capacity required for storing the statistics of the blocks.

The quantized values are stored in the memory areas, which are provided exclusively for the quantizied values in a statistic memory circuit 109. The number of those memory areas is equal to the number of blocks. The quantized statistics are added for each color component in an adder 110. The image signals used here are those in the L*-a*-b* space. Accordingly, the calculation is carried out on three components L*, a*, and b*.

A code quantity determining circuit 111 determines a code quantity assigned to each color component according to a statistic ratio of each component. That is, the bits are assigned to each component. The total code quantity to be assigned is the result of the subtraction of the code quantity for coding the DC components from the code quantity as the data compression target.

A code quantity distribution circuit 112 distributes code quantities, already assigned to the components, to the individual blocks. In other words, the circuit 112 determines the bit assignment to each block.

A quantizing factor determining circuit 113 calculates the mean value of in-block statistics for each image, and determines, on the basis of the mean value, a step width for quantizing the coefficient after the DCT coding operation, at the time of the regular scan to be given later. Specifically, for an image of a fine pattern, i.e., high definition, the quantizing step width is set to be large. For a monotone image, viz., an image of low definition, the quantizing step width is set to be small. In this case, the relationships between the mean value of the in-block statistics and the quantizing step widths have to be obtained in advance according to the compression widths have to be obtained in advance according to the compression ratio in preliminary experiments. The step width thus obtained is previously stored at the coefficient location in a quantizing matrix 114 constructed with a memory.

Then, the microcomputer 11 sends a regular scan command to the motor drive circuit 1k, which in turn causes the motor 1i to rotate at the normal speed. Under this condition, the scanning member 1e vertically scans the image at the normal speed for the regular scan.

In the regular scan, the image is loaded into a 8-line buffer 200 (see FIG. 8(b)) every eight lines. A block excising circuit 201 excises pixel blocks of 8×8 from the thus stored image data. A discrete cosine transforming circuit (DCT circuit in the figure) 202 performs the discrete cosine transformation of the pixel block data. The coefficient of 8 ×8 as the result of the discrete cosine transformation are quantized by a coefficient quantizing circuit 203. The value used for the quantizing step is that already determined by the quantizing factor determining circuit 113.

The coefficient quantized are Huffman coded by an AC-component coding circuit 204, and written into a code memory 205.

As described above, in the present embodiment, an image is discretely read through the prescan, so that the coding parameters are obtained. Following the prescan, the regular scan is performed to read all of the signals of the image. The quantizing operation of the transforming coefficients and the coding operation of the AC components are performed using the coding parameters that have been determined in the prescan stage. Therefore, the image data can be coded using only the 4-line image buffer for the prescan image and the 8-line image buffer for the main scan, not using a memory having a memory capacity enough to store all of the pixels of the image. As a result, the image data processing speed is increased, and a required memory capacity of the memory is reduced. The thus constructed image data compressing system can also employed for an image of high definition or a large image containing a great number of pixels that cannot be encoded efficiently by the conventional techniques.

Further, a single buffer for the 8-line image data storage may be used in common to both the 4-line buffer 100 for the prescan and the 8-line buffer 200 for the regular scan. In this case, in the prescan mode, the buffer is partially used for the 4-line image data storage. In the regular scan mode, the buffer is fully used for the 8-line image data storage. Use of such a single buffer further reduces the required memory capacity.

Furthermore, a definition of an original image, which is estimated on the basis of the image data read by the prescan, may be used for the parameter control in another coding system. In the blocks corresponding to a character area of high definition, the estimated definition is applied to setting up a coding system (or its parameters) that is schemed placing emphasis on the resolution reproduction quality improvement. In a monotone image of relatively low definition, such as photograph, a change of the pixel value in the block is gentle. For such an image, the estimated definition is applied to setting up a coding system (or its parameters) which is advantageous in gaining better tone reproduction. In this way, reproduction of a good image is ensured.

As described above, the prescan may be realized by the scan operation of which the scan speed is k (k is a positive integer) times as high as the normal scan speed. Further, the prescan can also be realized by discretely reading the image data from the memory. In this case, as shown in FIG. 9, the image on the original document is scanned at the normal scan speed as the prescan, and the entire image data is temporarily stored in a frame memory 301. Then, the image data stored is discretely read out of the memory 301. In FIG. 9, a low-pass filter 302 and a sub-sampling circuit 303 cooperate to discretely read the image data from the memory. The image data read out is supplied to the block excising circuit 101. In the coding process, the entire image data is read out of the frame memory 301, and supplied to the block excising circuit 201. Furthermore, it is also possible that the image data transferred through the communication line is temporarily stored in the memory, and then is discretely read out of the memory. Thus, with the discrete read-out of the image data, the image data can be encoded at an arbitrary compression ratio. Accordingly, the reduction of the transmission time and storage cost can be realized.

As described above, the parameters for encoding the image data can be determined using the partial image data that is extracted from the entire image data. This enables the image data to be processed at high speed. In the image data compressing system described above, there is no need for an image buffer of such a large memory capacity as to store the entire image data of the original image. In other words, the image buffer required for the image data compressing system may have a small memory capacity that is determined depending on the height of block component treated as the unit for image processing, the width of the image, the depth of each pixel, and the number of color components. Additionally, a fixed compression ratio can always be achieved irrespective of the image contents of the original document.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image data compressing method of the type in which a multi-valued image data signal read by an image input unit is compressed by an image data compressing circuit to be stored into a memory, comprising the steps of:

performing a prescan by the image input unit, thereby to obtain prescan image data containing pixels smaller in number than those contained in image data of an original image;

estimating a definition of the original image on the basis of the prescan image data, thereby to obtain coding parameters in the image data compressing circuit;

performing a regular scan by the image input unit, thereby to obtain regular scan image data containing all of pixels of the original image data; and compressing the regular scan image data using the coding parameters previously obtained.

2. The image data compressing method according to claim 1, wherein, when the original image is divided into blocks of n×m (n and m are positive integers) and data compressing process is applied to each of the blocks in the image data compressing circuit, a block size for the prescan image is selected so that the number of divisions in an main scan direction and the number of divisions in an auxiliary scan direction in the original image consisting of pixel blocks of n×m are equal to those of the prescan image respectively, and a degree of change of pixel value in each block of the original image is estimated by a degree of change of pixel value in each of those blocks of the prescan image, whereby to determine the coding parameter of each block.

3. The image data compressing method according to claim 2, wherein means pixel value information of each of blocks into which the original image is divided is predicted on the basis of mean pixel value information of a corresponding block in the prescan image formed by the prescan.

4. The image data compressing method according to claim 1, wherein the prescan is performed at a speed k times (k is a positive integer) that of the regular scan.

5. The image data compressing method according to claim 1, wherein the entire image data is temporarily stored in a frame memory, and the image data stored in discretely read out of the frame memory, whereby to obtain the prescan image data.

* * * * *

UNITED STATES PATENT AND TRADEMARK OFFICE
CERTIFICATE OF CORRECTION

PATENT NO. : 5,282,055
DATED : January 25, 1994
INVENTOR(S) : Kazuhiro Suzuki

It is certified that error appears in the above-indentified patent and that said Letters Patent is hereby corrected as shown below:

Claim 3, column 10, line 2, change "means" to --mean--.

Claim 5, column 10, line 12, change (second occurrence) "in" to --is--.

Signed and Sealed this

Eleventh Day of October, 1994

Attest:

BRUCE LEHMAN

*Attesting Officer*　　　*Commissioner of Patents and Trademarks*